United States Patent [19]

Alexander et al.

[11] Patent Number: 4,612,263

[45] Date of Patent: Sep. 16, 1986

[54] POWER CELL HAVING A GLASS SOLID ELECTROLYTE

[75] Inventors: M. Grayson Alexander, Windsor; Brian Riley, Willimantic, both of Conn.

[73] Assignee: Combustion Engineering, Inc., Windsor, Conn.

[21] Appl. No.: 782,364

[22] Filed: Oct. 1, 1985

[51] Int. Cl.$^4$ .............................. H01M 6/18
[52] U.S. Cl. ................... 429/104; 429/193; 429/33
[58] Field of Search ............ 429/193, 191, 33, 104; 252/62.6; 501/55, 64, 72, 73

[56] References Cited

U.S. PATENT DOCUMENTS

| | | | |
|---|---|---|---|
| 3,404,039 | 10/1968 | Mitoff | 429/33 |
| 3,684,578 | 8/1972 | Makishima et al. | 429/33 |
| 3,737,331 | 6/1973 | Anderson | 429/33 X |
| 3,754,995 | 8/1973 | Kleinschmager | 429/33 |
| 4,142,024 | 2/1979 | Van den Berghe et al. | 429/33 X |
| 4,230,778 | 10/1980 | von Benda et al. | 429/104 |

OTHER PUBLICATIONS

A. Buri et al., "Relationship Between Composition and Glass Transition Temperature in $Na_2O$—$M_2O_3$—$SiO_2$ Glasses (M=Ga, In, Sc, Y, La)", Physics and Chemistry of Glasses, vol. 23, No. 1, Feb. 1982, pp. 37–40.
R. D. Shannon et al., "Ionic Conductivity in $Na_5YSI_4O_{12}$ Type Silicates", Inorganic Chemistry, vol. 17, No. 4, 1978, pp. 958–964.
D. Ravaine et al., "The Ionic Conductivity of Rapidly Quenched Tungstate and Molybdate Glasses Containing Lithium Halides", Solid State Ionics, vol. 13 (1984), pp. 15–20.
S. Susman et al., "Ionic Conductive Glass", CA Selects-Batteries & Fuel Cells, Issue 21, 1984, p. 6 (101: 134151n).
F. Branda et al., "The Glass Transition Temperatures of Soda-Silica Glass Containing $M_2O_3$ Oxides (M=Al, Ga, In, Sc, Y, La)", Physics and Chemistry of Glasses, vol. 22, No. 3, Jun. 1981, pp. 68–69.
S. Susman et al., "Nasiglas: A New Vitreous Electrolyte", Solid State Ionics 9 & 10 (1983) pp. 667–673.

Primary Examiner—Anthony Skapars
Attorney, Agent, or Firm—Brumbaugh, Graves, Donohue & Raymond

[57] ABSTRACT

A power cell having an anode, a cathode and a solid electrolyte is improved by having as the solid electrolyte a glass comprising either (1) from about 22 mole percent to about 47 mole percent $Na_2O$, from about 4 mole percent to about 9 mole percent $Y_2O_3$ and from about 47 mole percent to about 70 mole percent $SiO_2$ or (2) from about 34 mole percent to about 47 mole percent $Li_2O$, from about 5 mole percent to about 9 mole percent $Y_2O_3$ and from about 47 mole percent to about 58 mole percent $SiO_2$.

8 Claims, No Drawings

POWER CELL HAVING A GLASS SOLID ELECTROLYTE

The present invention relates to a power cell and more particularly to a power cell or battery having a glass solid electrolyte.

In view of the fact that glasses can be formed into thin sheets or small diameter tubes, a higher electrolyte resistance can be tolerated for a power cell or a battery than is possible with a ceramic electrolyte, while still attaining good energy density. Glasses are also generally simple to synthesize. These two points have encouraged many researchers to attempt to develop glass solid electrolytes for Na/S power cells or other cells. Such electrolytes must have ionic conductivities of at least $10^{-4}$ (ohm-cm)$^{-1}$ *at the temperature of use, e.g.*, 300° C., and be compatible with the chosen anode and cathode materials.

It is the principal object of the present invention to provide a power cell or battery having an improved glass solid electrolyte.

In accordance with a first embodiment of the present invention, a power cell or battery having an anode, a cathode and a solid electrolyte is improved by having as the solid electrolyte a glass comprising from about 22 mole percent to about 47 mole percent $Na_2O$, from about 4 mole percent to about 9 mole percent $Y_2O_3$ and from about 47 mole percent to about 70 mole percent $SiO_2$. Preferably, in this first embodiment the glass solid electrolyte in the power cell or battery comprises about 39 mole percent $Na_2O$, about 8 mole percent $Y_2O_3$ and about 53 mole percent $SiO_2$.

In accordance with a second embodiment of the present invention, the power cell or battery having an anode, a cathode and a solid electrolyte is improved by having as the solid electrolyte a glass comprising from about 34 mole percent to about 47 mole percent $Li_2O$, from about 5 mole percent to about 9 mole percent $Y_2O_3$ and from about 47 mole percent to about 58 mole percent $SiO_2$. Preferably, in this second embodiment the glass solid electrolyte in the power cell or battery comprises about 47 mole percent $Li_2O$, about 6 mole percent $Y_2O_3$ and about 47 mole percent $SiO_2$.

The anode and cathode are preferably sodium (Na) and sulfur (S), respectively, in the first embodiment, whereas the anode and cathode are preferably lithium (Li) and sulfur (S), respectively, in the second embodiment. However, other conventional electrode materials could be used as the two electrodes.

The improved glass solid electrolytes used in the power cells of the present invention were synthesized in accordance with the following procedure. Appropriate amounts of $Na_2CO_3$ or $Li_2CO_3$, $Y_2O_3$ and $SiO_2$ were slurry milled in acetone, dried, calcined in alumina crucibles at 700° C.–1000° C. for 8 hours to drive off $CO_2$, then air cooled. The calcined material was transferred to a platinum crucible and melted in air at a furnace temperature of 1000° C. to 1600° C., depending on the composition. Each melt was held at about 50° C. above the melting temperature for one hour to remove gas bubbles, then the crucible was rapidly removed from the furnace and the liquid poured onto a room temperature alumina refractory brick. A radiation shield was placed over the quenched melts to prevent ultra-rapid surface cooling.

Using the above synthesis procedure, glass solid electrolytes were prepared having the compositions set forth in Tables I and II below. Their ionic conductivities are also set forth in Tables I and II.

Total (electronic+ionic) conductivities were measured by a standard AC method (J. E. Bauerle, J. Phys. Chem. Solids 30, 2657 (1969)). Since the electronic conductivities of glasses are very small, it was assumed that the ionic conductivities set forth in Tables I and II below are equal to the measured total conductivities.

TABLE I

| Composition - mole percent | | | Ionic Conductivity at 300° C. |
|---|---|---|---|
| $Na_2O$ | $Y_2O_3$ | $SiO_2$ | (ohm-cm)$^{-1}$ |
| 22.16 | 8.76 | 69.08 | $9.77 \times 10^{-5}$ |
| 26.85 | 8.94 | 64.21 | $1.55 \times 10^{-4}$ |
| 39.12 | 5.02 | 55.86 | $2.14 \times 10^{-4}$ |
| 29.01 | 8.50 | 62.48 | $3.76 \times 10^{-4}$ |
| 31.65 | 8.53 | 59.82 | $5.03 \times 10^{-4}$ |
| 29.27 | 7.85 | 62.88 | $5.69 \times 10^{-4}$ |
| 42.69 | 4.76 | 52.54 | $6.64 \times 10^{-4}$ |
| 35.05 | 7.55 | 57.39 | $8.91 \times 10^{-4}$ |
| 37.92 | 7.64 | 54.44 | $1.18 \times 10^{-3}$ |
| 36.22 | 8.45 | 55.33 | $1.23 \times 10^{-3}$ |
| 37.89 | 8.00 | 54.11 | $1.50 \times 10^{-3}$ |
| 44.94 | 4.58 | 50.48 | $1.51 \times 10^{-3}$ |
| 37.78 | 5.91 | 56.31 | $1.88 \times 10^{-3}$ |
| 38.67 | 4.39 | 56.94 | $1.99 \times 10^{-3}$ |
| 46.48 | 5.69 | 47.83 | $2.40 \times 10^{-3}$ |
| 39.05 | 7.54 | 53.40 | $3.39 \times 10^{-3}$ |

TABLE II

| Composition - mole percent | | | Ionic Conductivity at 300° C. |
|---|---|---|---|
| $Li_2O$ | $Y_2O_3$ | $SiO_2$ | (ohm-cm)$^{-1}$ |
| 40.87 | 6.89 | 52.24 | $2.82 \times 10^{-4}$ |
| 34.84 | 7.78 | 57.38 | $4.07 \times 10^{-4}$ |
| 38.17 | 8.40 | 53.43 | $4.89 \times 10^{-4}$ |
| 40.08 | 5.55 | 54.37 | $1.30 \times 10^{-3}$ |
| 39.71 | 6.20 | 54.09 | $1.38 \times 10^{-3}$ |
| 42.08 | 5.28 | 52.63 | $1.74 \times 10^{-3}$ |
| 43.39 | 5.33 | 51.28 | $2.45 \times 10^{-3}$ |
| 47 | 6 | 47 | $2.98 \times 10^{-3}$ |

The glasses in Tables I and II above were clear and colorless or light green.

From the data in Table I, it will be noted that all the glasses had ionic conductivities between about $1 \times 10^{-4}$ and about $4 \times 10^{-3}$ (ohm-cm)$^{-1}$ at 300° C., making them acceptable as solid electrolytes for power cells operating at that temperature or higher. The highest ionic conductivity, namely, $3.4 \times 10^{-3}$ (ohm-cm)$^{-1}$, at 300° C., occurred for the glass formed of about 39 mole percent $Na_2O$, about 8 mole percent $Y_2O_3$ and about 53 mole percent $SiO_2$. This ionic conductivity is 2.3 times higher than that recently reported for the best sodium zirconium phosphosilicate glass synthesized by Argonne National Laboratory, namely, $1.5 \times 10^{-3}$ (ohm-cm)$^{-1}$. (S. Susman, C. J. Delbecq, J. A. Mc. Millan and M. F. Roche, Solid State Ionics 9/10 667 (1983))

Also from the data in Table II above it will be noted that all the glasses had ionic conductivities between about $2 \times 10^{-4}$ and about $3 \times 10^{-3}$ (ohm-cm)$^{-1}$ at 300° C., making them acceptable as solid electrolytes for power cells operating at that temperature or higher. The highest ionic conductivity, namely, $2.98 \times 10^{-3}$ (ohm-cm)$^{-1}$ at 300° C., occurred for the glass formed of about 47 mole percent $Li_2O$, about 6 mole percent $Y_2O_3$ and about 47 mole percent $SiO_2$.

Compatability tests were run on the glass solid electrolytes used in the power cells of the present invention. Thus, pieces of various compositions of the glasses were placed in silica tubes along with elemental sodium (Na) or lithium (Li) or sulfur (S) inside an argon atmosphere glovebox, sealed, removed from the glovebox and heated inside an autoclave at 200° C. and 300° C. The samples were left at these temperatures for several days, then removed and examined by scanning electron microscope (SEM) and energy dispersion analysis. Discoloration of the samples was observed, but examination showed that this was due to a surface coating of sodium or lithium or sulfur on the samples and not to chemical reactions.

The above data on ionic conductivity and compatability show that the glass solid electrolytes are suitable for use in the power cells of the present invention, particularly the power cells having a molten sodium or lithium anode and a molten sulfur cathode.

What is claimed is:

1. In a power cell having an anode, a cathode and a solid electrolyte, the improvement which comprises said solid electrolyte is a glass comprising from about 22 mole percent to about 47 mole percent $Na_2O$, from about 4 mole percent to about 9 mole percent $Y_2O_3$ and from about 47 mole percent to about 70 mole percent $SiO_2$.

2. A power cell as defined by claim 1 wherein said solid electrolyte is a glass comprising about 39 mole percent $Na_2O$, about 8 mole percent $Y_2O_3$ and about 53 mole percent $SiO_2$.

3. In a power cell having an anode, a cathode and a solid electrolyte, the improvement which comprises said solid electrolyte is a glass comprising from about 34 mole percent to about 47 mole percent $Li_2O$, from about 5 mole percent to about 9 mole percent $Y_2)_3$ and from about 47 mole percent to about 58 mole percent $SiO_2$.

4. A power cell as defined by claim 3 wherein said solid electrolyte is a glass comprising about 47 mole percent $Li_2O$, about 6 mole percent $Y_2O_3$ and about 47 mole percent $SiO_2$.

5. A power cell comprising a sodium anode, a sulfur cathode and a glass solid electrolyte formed of from about 22 mole percent to about 47 mole percent $Na_2O$, from about 4 mole percent to about 9 mole percent $Y_2O_3$ and from about 47 mole percent to about 70 mole percent $SiO_2$.

6. A power cell as defined by claim 5 wherein said glass solid electrolyte is formed of about 39 mole percent $Na_2O$, about 8 mole percent $Y_2O_3$ and about 53 mole percent $SiO_2$.

7. A power cell comprising a lithium anode, a sulfur cathode and a glass solid electrolyte formed of from about 34 mole percent to about 47 mole percent $Li_2O$, from about 5 mole percent to about 9 mole percent $Y_2O_3$ and from about 47 mole percent to about 58 mole percent $SiO_2$.

8. A power cell as defined by claim 7 wherein said glass solid electrolyte is formed of about 47 mole percent $Li_2O$ about 6 mole percent $Y_2O_3$ and about 47 mole percent $SiO_2$.

* * * * *